Figure 1:
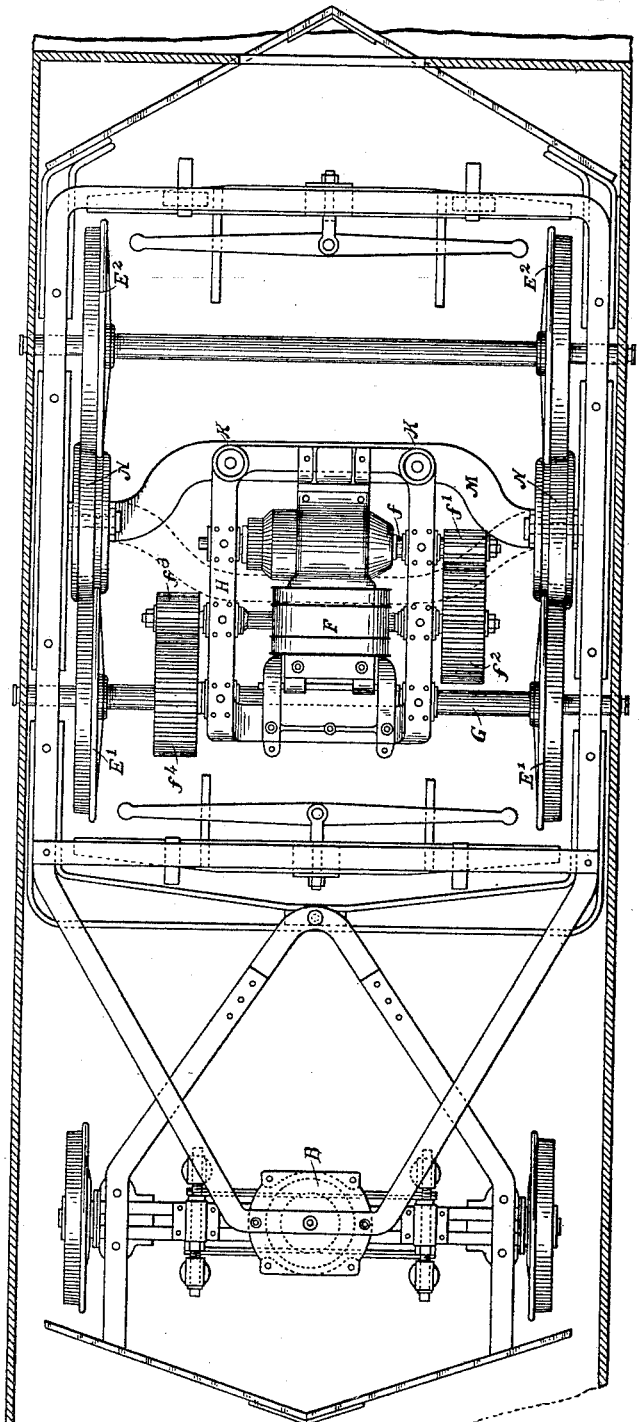

(No Model.) 2 Sheets—Sheet 1.

G. WESTINGHOUSE, Jr.
ELECTRIC LOCOMOTOR.

No. 450,652. Patented Apr. 21, 1891.

Witnesses
James H. Smith
Richard V. Popham

Inventor
George Westinghouse Jr.
By his Attorney
Charles A. Terry

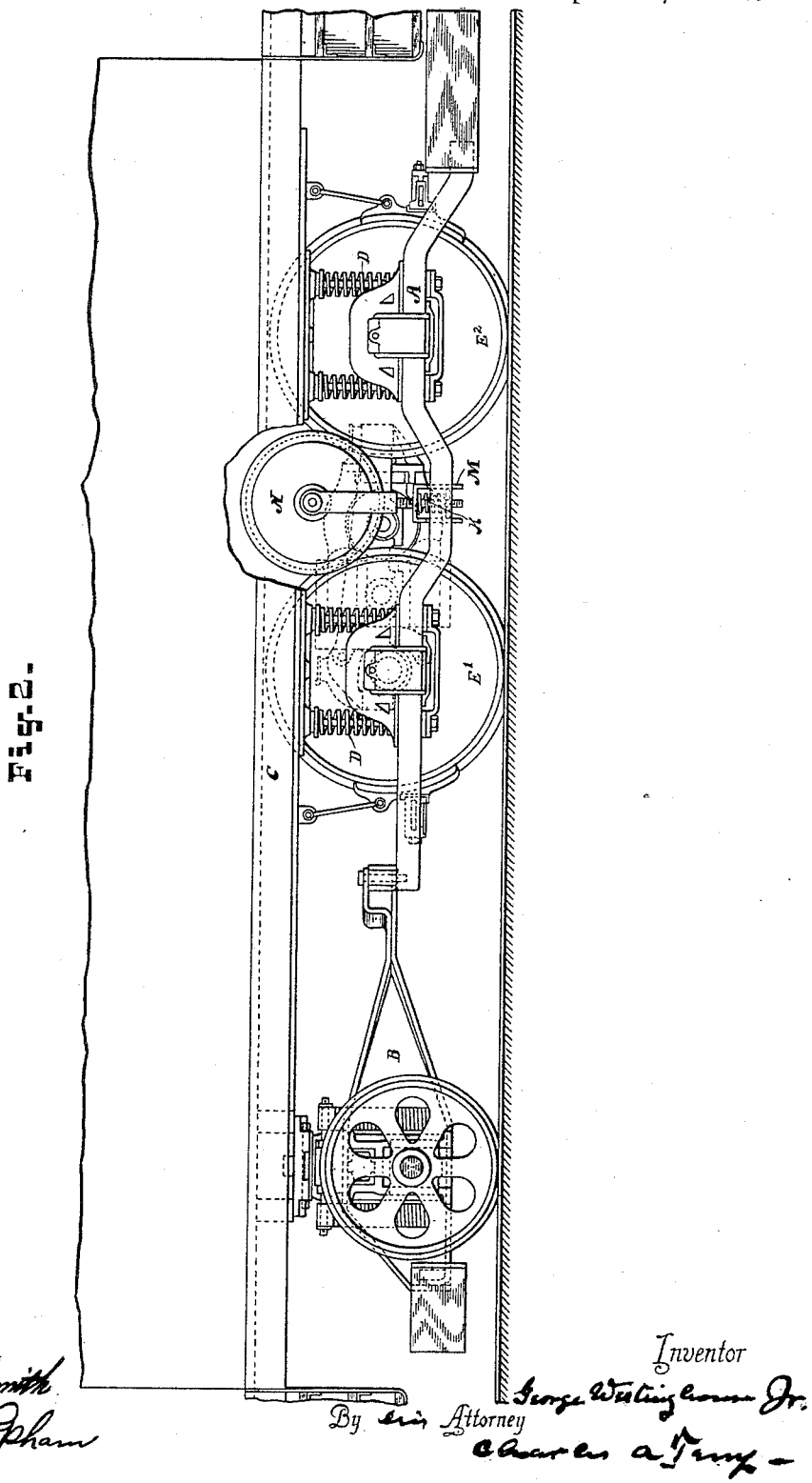

UNITED STATES PATENT OFFICE.

GEORGE WESTINGHOUSE, JR., OF PITTSBURG, PENNSYLVANIA.

ELECTRIC LOCOMOTOR.

SPECIFICATION forming part of Letters Patent No. 450,652, dated April 21, 1891.

Application filed August 1, 1890. Serial No. 360,624. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Electric Locomotors, (Case No. 434,) of which the following is a specification.

The invention relates to the construction of electric locomotors, and the object is to secure the requisite friction between the car-wheels and track-rails for carrying heavy loads and ascending grades.

In carrying out the invention a car is constructed with a main truck which receives the greater share of the weight of the car. A supplemental or pony truck may be placed near one end of the car-body and it will serve to steady its movement.

The invention further consists in so distributing the weight of the car-body that the greatest pressure is normally exerted upon that particular pair of main truck-wheels to which the driving-power is directly applied. The friction between these wheels and the track will be sufficient for carrying ordinary loads. When the motor is called upon to develop greater power, to carry unusual loads, or to ascend grades, then the second pair of main truck-wheels is firmly coupled to the first pair by means of interposed friction-wheels, the pressure of which upon the truck-wheels is dependent upon and determined by the torque exerted by the motor. The friction of both pairs of wheels is then utilized.

The invention will be particularly described in connection with the accompanying drawings, in which—

Figure 1 is a plan of a truck embodying the improvements, and Fig. 2 is a side elevation.

Referring to the figures, A represents the frame of the main truck, and B the frame of the supplemental or pony truck. The latter is coupled or pivoted to the frame of the main truck A, or to some suitable part of the car-body. The car-body is supported upon a frame carried by the main and pony trucks. The supporting-springs D, which carry the frame C, are preferably so adjusted that normally the greater share of the load is carried by the wheels E' of the main truck.

An electric motor is shown at F. Its armature-shaft $f$ carries a pinion $f'$, which gears with the toothed wheel $f^2$. The shaft of this wheel carries a pinion $f^3$, gearing with the wheel $f^4$ upon the axle G of the truck-wheels E'. The entire motor is carried in a frame H, which is supported at one end by the axle G. The other end of the motor-frame is carried by the spring K, which rests upon the channel-bar or cross-beam M. This bar carries at its respective extremities two friction-wheels N N. These rest between and run upon the driving-wheels E' and E² of the main truck. The friction-wheels N are thus at all times pressed downward by reason of the weight of the motor. The amount of pressure necessary to be exerted upon the wheels N to prevent them from slipping upon either the wheels E' or E² will vary with the load being carried, so that in order to utilize the traction of the wheels E² for propelling the car it becomes necessary to increase the pressure of the wheels N with an increase of load. This is accomplished as follows: When the motor is driven forward, the rotation of the pinion $f^3$ tends to thrust the end of the motor carrying the armature downward. This causes not only the weight of the motor, but the additional pressure due to the torque of the armature, to be exerted upon the bar M, thus forcing the friction-wheels N more firmly against the truck-wheels.

The pony-truck B is desired, usually, to better distribute the weight of the car and to steady its motion and prevent the unpleasant swinging and lurching to which cars having but a single supporting-truck are subject. At the same time it permits the wheels E' to be brought beneath the center of the car.

The point of support of the wheels N with reference to the motor may be varied for varying the amount of effective pressure exerted upon the wheels. Thus the bar M may be placed in the position shown in the dotted lines, Fig. 1—that is to say, nearer the axis of the pinion $f^3$. In such position a greater downward pressure would be exerted under the same load than in the position shown in the full lines.

I claim as my invention—

1. The combination, with an electric motor, of a car-truck having two or more pairs of wheels, means for driving one pair of wheels by the operation of the motor, and friction-wheels coupling said wheels with another pair of wheels of the truck, said friction-wheels supporting one end of the motor, whereby the pressure exerted by the friction-wheels is increased by the torque of the motor.

2. The combination, with a car-truck having two pairs of wheels, of friction-wheels coupling the corresponding wheels of the respective pairs, and an electric motor for driving one pair of wheels direct, said motor having one end supported by said friction-wheels, substantially as described.

3. The combination, in an electric locomotor, of friction-wheels for communicating motion from the driving-wheels to other wheels of the truck, said friction-wheels supporting a portion of the weight of the electric motor, substantially as described.

4. The combination, with a car or vehicle, of a driving-motor having one end supported from the driving-axle, and friction-wheels interposed between the driving-wheels and other wheels of the car-truck supporting the other end of the motor.

5. In an electric car, the combination of a main truck having one pair of wheels beneath the center of the body of the car, the central wheels receiving the greater share of the weight of the car, a supplemental or pony truck, friction-wheels coupling said central wheels with other wheels of the corresponding truck, and means for varying the pressure and with which said friction-wheels press against the truck-wheels with variations in the load, substantially as described.

In testimony whereof I have hereunto subscribed my name this 28th day of July, A. D. 1890.

GEO. WESTINGHOUSE, JR.

Witnesses:
W. D. UPTEGRAFF,
CHARLES A. TERRY.